US011387737B2

(12) United States Patent
Tang (10) Patent No.: US 11,387,737 B2
(45) Date of Patent: Jul. 12, 2022

(54) CURRENT SHARING FOR A MULTI-PHASE POWER CONVERTER (71) Applicant: Infineon Technologies Austria AG, Villach (AT)

(72) Inventor: Benjamim Tang, Rancho Palos Verdes, CA (US)

(73) Assignee: Infineon Technologies Austria AG, Villach (AT)

(*) Notice: Subject to any disclaimer, the term of this patent is extended or adjusted under 35 U.S.C. 154(b) by 149 days.

(21) Appl. No.: 16/850,767

(22) Filed: Apr. 16, 2020

(65) Prior Publication Data

US 2021/0328510 A1 Oct. 21, 2021

(51) Int. Cl.
H02M 3/158 (2006.01)
H02M 1/00 (2006.01)
H02M 3/156 (2006.01)

(52) U.S. Cl.
CPC ....... *H02M 3/1586* (2021.05); *H02M 1/0009* (2021.05); *H02M 3/1566* (2021.05)

(58) Field of Classification Search
CPC ............ H02M 1/0003; H02M 1/0009; H02M 1/0041; H02M 1/32; H02M 1/327; H02M 3/02; H02M 3/04; H02M 3/10; H02M 3/145; H02M 3/155; H02M 3/156; H02M 3/1566; H02M 3/158; H02M 3/1582; H02M 3/1584; H02M 3/1586; H02M 3/1588; H02M 1/08; H02M 1/38
See application file for complete search history.

(56) References Cited

U.S. PATENT DOCUMENTS

| 6,795,009 | B2 | 9/2004 | Duffy et al. |
| 6,940,262 | B2 | 9/2005 | Dequina et al. |
| 6,943,535 | B1* | 9/2005 | Schiff ................. H02M 3/1584 323/246 |
| 7,265,601 | B2 | 9/2007 | Ahmad |
| 7,683,594 | B2 | 3/2010 | Kim et al. |
| 7,898,310 | B2 | 3/2011 | Qui et al. |
| 8,207,720 | B2 | 6/2012 | Tang et al. |

(Continued)

OTHER PUBLICATIONS

Cheung, Chun, et al., "Phase Doubler for High Power Voltage Regulators", 2010 Twenty-Fifth Annual IEEE Applied Power Electronics Conference and Exposition (APEC).

*Primary Examiner* — Kyle J Moody
(74) *Attorney, Agent, or Firm* — Murphy, Bilak & Homiller, PLLC (57) ABSTRACT

A power stage of a multi-phase power converter includes: a first switch device configured to connect an output node of the power stage to a supply voltage in a first switching state of the power stage; a second switch device configured to connect the output node to ground in a second switching state of the power stage; driver circuitry configured to set the power stage in either switching state or a non-switching state, a duration of each state and a timing transition between the states being indicated by a control signal; current sense circuitry configured to measure current flowing through at least one of the switch devices; and timing circuitry configured to adjust the timing transition between switching states so as to change an effective duration of the first and/or second switching state relative to a reference duration defined by the control signal, based on magnitude of the measured current.

20 Claims, 8 Drawing Sheets

(56) References Cited

U.S. PATENT DOCUMENTS

| | | | |
|---|---|---|---|
| 8,222,879 B2 | 7/2012 | Nguyen | |
| 8,344,777 B2 | 1/2013 | Qiu et al. | |
| 9,178,408 B2 | 11/2015 | Zuniga et al. | |
| 9,570,985 B2 | 2/2017 | Sato et al. | |
| 9,712,046 B2 | 7/2017 | Sandner et al. | |
| 9,806,621 B1* | 10/2017 | Babazadeh | H02M 3/33507 |
| 10,511,226 B1* | 12/2019 | Gurlahosur | H02M 3/1584 |
| 11,196,342 B2* | 12/2021 | Tang | H02M 3/158 |
| 2003/0029631 A1* | 2/2003 | Bassett | G06F 1/26 |
| | | | 174/250 |
| 2006/0001408 A1* | 1/2006 | Southwell | H02M 3/1584 |
| | | | 323/282 |
| 2006/0055388 A1* | 3/2006 | Tang | H02M 3/1584 |
| | | | 323/284 |
| 2007/0069236 A1* | 3/2007 | Capodivacca | H03K 17/063 |
| | | | 257/138 |
| 2008/0164859 A1* | 7/2008 | Peng | H02M 3/157 |
| | | | 323/318 |
| 2008/0303495 A1* | 12/2008 | Wei | G05F 3/04 |
| | | | 323/272 |
| 2009/0058379 A1* | 3/2009 | Sreenivas | H02M 3/1588 |
| | | | 323/241 |
| 2009/0121695 A1* | 5/2009 | Pierson | H02M 3/1584 |
| | | | 323/283 |
| 2010/0277961 A1* | 11/2010 | Moyer | H02M 1/32 |
| | | | 363/163 |
| 2011/0260537 A1* | 10/2011 | Tang | H02M 3/158 |
| | | | 307/55 |
| 2012/0200274 A1* | 8/2012 | Tang | H02M 3/1584 |
| | | | 323/271 |
| 2013/0099840 A1* | 4/2013 | Lee | H02M 3/156 |
| | | | 327/175 |
| 2014/0015500 A1 | 1/2014 | Babazadeh et al. | |
| 2015/0236595 A1* | 8/2015 | Babazadeh | H02M 3/1584 |
| | | | 323/272 |
| 2016/0233766 A1* | 8/2016 | Todorov | H02M 3/1584 |
| 2017/0012526 A1 | 1/2017 | Chen | |
| 2018/0048232 A1* | 2/2018 | Adell | H02M 3/1563 |
| 2019/0273439 A1* | 9/2019 | Desai | H02M 1/14 |
| 2019/0393786 A1* | 12/2019 | Chang | H02M 3/1584 |
| 2021/0099084 A1* | 4/2021 | Cheng | H02M 1/0061 |

* cited by examiner

CURRENT SHARING FOR A MULTI-PHASE POWER CONVERTER

BACKGROUND

For high power ICs such as microprocessors, a high phase count multiphase buck voltage regulator is often needed to meet the high current requirements. Multiphase buck voltage regulators are an efficient way to parallel power stages, support interleaving of the phase PWM (pulse width modulation) pulses, and provide current balancing to ensure that the current is distributed somewhat evenly among all the available power stages. In general, the higher the number of phases, the more PWM outputs and current sense inputs that are required for the controller, thus increasing pin count, complexity and cost for the controller and system.

Methods such as phase paralleling and using phase doublers or triplers/quads increase the number of parallel power stages without increasing the phase count on the controller, which are typically limited to 8 or 16 total phases. Higher phase count controllers are niche devices which are more expensive and use non-standard footprints.

In the case of phase paralleling, where a single PWM input drives multiple parallel power stages, the current is not shared evenly between the stages thus leading to current hogging by one or more power stages. Current hogging can lead to overcurrent and overtemperature conditions.

In the case of phase doublers and triplers/quads, special driver circuits are required to drive parallel power stages independently, alternating or modifying the PWM pulses such that the current remains balanced between the parallel stages. However, phase doubler and tripler/quad driver circuits are discrete devices, require a different layout scheme to support the use of parallel switches, and rely primarily on RDSon (transistor on-state resistance) sensing to provide current balancing.

Thus, there is a need for a low complexity solution that allows power stages to be driven in parallel as one phase but with reduced current hogging between parallel power stages of the same phase.

SUMMARY

According to an embodiment of a power stage of a multi-phase power converter, the power stage comprises: a first switch device configured to connect an output node of the power stage to a supply voltage in a first switching state of the power stage; a second switch device configured to connect the output node to ground in a second switching state of the power stage; driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by a switching control signal received by the power stage; current sense circuitry configured to measure current flowing through at least one of the switch devices; and timing circuitry configured to adjust the timing transition between the switching states so as to change an effective duration of the first switching state and/or the second switching state relative to a reference duration defined by the switching control signal, wherein the adjustment to the timing transition is based on the magnitude of the current measured by the current sense circuitry.

According to an embodiment of a multi-phase power converter, the multi-phase power converter comprises: a plurality of phases, each phase configured to deliver a portion of a total current of the multi-phase power converter to a load connected to an output of the multi-phase power converter and comprising at least two power stages coupled in parallel; and a controller configured to generate a separate switching control signal for each phase, wherein the same switching control signal is provided to each parallel-coupled power stage of the same phase. Each power stage of each phase is coupled to the output of the multi-phase power converter and comprises: a first switch device configured to connect the load to a supply voltage in a first switching state of the power stage; a second switch device configured to connect the load to ground in a second switching state of the power stage; an inductor configured to couple an output of the power stage to the output of the multi-phase power converter; driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by the corresponding switching control signal generated by the controller; current sense circuitry configured to measure current flowing through at least one of the switch devices; and timing circuitry configured to adjust the timing transition between the switching states so as to change an effective duration of the first switching state and/or the second switching state relative to a reference duration defined by the switching control signal generated by the controller for the phase that includes the power stage, wherein the adjustment to the timing transition is based on the magnitude of the current measured by the current sense circuitry and independent of the current measured for the other power stages of the same phase.

According to an embodiment of an electronic system, the electronic system comprises: a circuit board and one or more electronic circuits attached to the board and presenting a load to a multiphase power converter or power supply attached to the circuit board. The multiphase power converter implements the power supply, is configured to provide power to the load, and comprises: a plurality of phases, each phase configured to deliver current to the load and comprising at least two power stages coupled in parallel; and a controller configured to provide a separate switching control signal to each phase. Each power stage of each phase comprises: a first switch device configured to connect the load to a supply voltage in a first switching state of the power stage; a second switch device configured to connect the load to ground in a second switching state of the power stage; driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by the corresponding switching control signal generated by the controller; current sense circuitry configured to measure current flowing through at least one of the switch devices; and timing circuitry configured to adjust the timing transition between the switching states so as to change an effective duration of the first switching state and/or the second switching state relative to a reference duration defined by the switching control signal generated by the controller for the phase that includes the power stage, wherein the adjustment to the timing transition is based on the magnitude of the current measured by the current sense circuitry and independent of the current measured for the other power stages of the same phase.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Uke reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a power stage for a multi-phase power converter with an anti-current hogging scheme built into the power stage. Two or more of these power stages may be coupled in parallel to form one phase of a multi-phase power converter without the risk of current hogging by one or more power stages of the same phase. Each power stage uses its own current sense circuit information to modify its effective duty cycle as the current in the power stage increases. When connected in parallel, each group of paralleled power stages may share a common switching control input such as a common PWM input, and the power stage outputs may be connected together via separate inductors. Such a system allows for increased current handling capability, so long as the current is shared somewhat evenly among the power stages.

If the current in a group of parallel coupled power stages is not even, the switching behavior is adjusted such that the current would be reduced in each power stage that is carrying disproportionately higher current, thus reducing current hogging by one or more power stages of the same phase. The current sense pins of the power stages coupled together to form the same phase may be tied together, so that the paralleled power stages may then be interfaced with what the controller sees as a single phase with a current handling capability equivalent to the sum of the capability of the power stages in parallel. This effectively allows the number of parallel stages supported by a multiphase controller to be scaled up by the number of parallel power stages in each group. The techniques describes herein thus allow for 'hyper-phase' power converter systems where there is still interleaving and current sharing among the phase groups, with an anti-current hogging scheme implemented by the parallel power stages of the same group/phase to mitigate current hogging and allow higher currents to be reached.

The term "power converter" as used herein broadly refers to any type of power converter or voltage regulator (VR) that provides one or more regulated voltages to one or more electronic loads such as an Ethernet switch, an ASIC (application-specification integrated circuit), a memory device, a processor such as a central processing unit (CPU), microprocessor, graphics processing unit (GPU), digital signal processor (DSP), artificial intelligence (AI) accelerator, image processor, network or packet processor, coprocessor, multi-core processor, front-end processor, baseband processor, etc. For example, the power converter may be a buck converter, a boost converter, a buck-boost converter, a switched capacitor voltage regulator, a step-down converter, etc. The power converter may be implemented as a power device module.

The term "power device module" as used herein means a packaged functional assembly that includes at least one power switch of a power stage used in converting a voltage from one level to another level, e.g., as is done in power conversion and voltage regulation. The power device module may also include a driver circuit for driving the at least one power switch. The power device module may additionally include a controller for controlling the driver circuit so as to implement the power converter. The controller and/or driver functionality may instead be implemented outside the power device module. The driver circuit for the at least one power switch included in the power device module also may be outside the power device module. Various passive components such as capacitors and/or inductors that make up the power converter may be included in the power device module, surface mounted to the power device module, located on a separate circuit board, etc.

Described next in more detail are various embodiments of the anti-current hogging scheme for power stages, a multiphase power converter that includes groups of parallel coupled power stages each implementing the anti-current hogging scheme, and an electronic system that includes the multiphase power converter.

Figure 1:
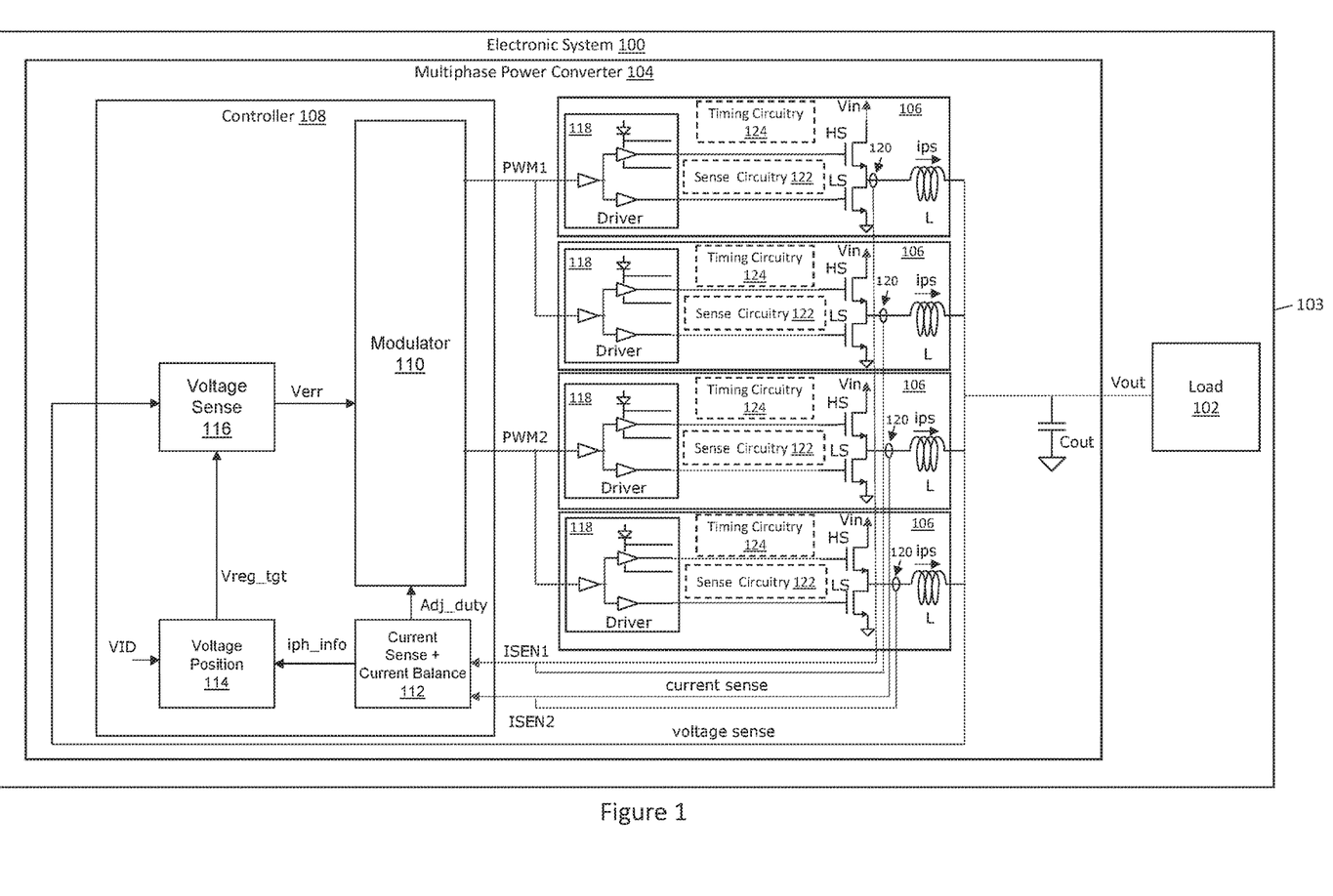
FIG. 1 illustrates a block diagram of an embodiment of an electronic system that includes a load and a multiphase power converter configured to regulate an output voltage provided to the load.

FIG. 1 illustrates an embodiment of an electronic system 100 that includes one or more electronic circuits attached to a circuit board 103 such as a PCB (printed circuit board) and presenting a load 102 to a multiphase power converter 104 or power supply attached to the circuit board 103. The multiphase power converter 104 implements the power supply and provides power to the load 102 by regulating an output voltage (Vout) provided to the load 102. The load 102 may be any type of electronic load requiring a regulated supply voltage. For example, the load 102 may be an Ethernet switch, an ASIC, a memory device, a processor such as a CPU, microprocessor, GPU, DSP, AI accelerator, image processor, network or packet processor, coprocessor, multi-core processor, front-end processor, baseband processor, etc. The multiphase power converter 104 is shown as a buck converter in FIG. 1 just as an example. In this example, the multiphase power converter 104 includes groups of two or more power stages 106 coupled in parallel, each group of parallel coupled power stages 106 forming one phase of the multiphase power converter 104.

In general, the multiphase power converter 104 may be any type of multiphase power converter or voltage regulator that provides one or more regulated voltages (Vout) to the load 102. For example, the multiphase power converter 104 may be a buck converter as shown in FIG. 1, a boost converter, a buck-boost converter, a switched capacitor voltage regulator, a step-down converter, etc. and may be implemented as a power device module, as previously described herein.

FIG. 1 shows two phases, each phase having two power stages 106 coupled in parallel. This is for ease of illustration only. The number of phases depends on the phase count of the controller 108, and the number of parallel coupled power stages 106 per phase depends on the current requirements of the load 102. Hence, the number of phases and the number of parallel coupled power stages 106 per phase depends on the choice of controller 108 and the load environment. In general, the controller 108 is an N-phase controller and there are m power stages 106 coupled in parallel per phase, where N is a positive integer a 2 and m is a positive integer a 2.

Each power stage 106 is configured to provide a current (ips) to the load 102 through a respective inductor (L). An output capacitor (Cout) of the multiphase power converter 104 which, e.g., may be implemented as a bank of capacitors reduces output voltage ripple. The controller 108 is configured to generate a separate switching control signal (PWM_N) for each phase so as to regulate the output voltage Vout provided to the load 102. The power stages 106 included in the same phase receive the same switching control signal.

The power converter controller 108 includes a modulator 110 for generating the switching control signal 'PWM_N' for each phase so as to regulate the output voltage Vout provided to the load 102. In one embodiment, the modulator 110 implements pulse width modulation (PWM).

The controller 108 may also include a current sense and balance circuit 112 for sensing each phase current delivered by the parallel coupled power stages 106 of the same at a corresponding current sense terminal (ISEN_N) of the controller 108, and converting the sensed current information into phase current information (iph_info). The current sense and balance circuit 112 also converts the phase current information into adjustments (Adj_duty) to the duty cycle generated by the modulator 110 for each individual phase, to adjust the phase currents so the phase currents remain balanced in the case of multi-phase operation. The output current (ips) of each power stage 106 included in the same phase may be combined so that the controller 108 has a single current sense terminal 'ISEN_N' per phase. In one embodiment, the measured currents 'ips' for the power stages 106 of the same phase are coupled via respective resistors to the same current sense input terminal 'ISEN_N' of the controller 108. The current sense and balance circuit 112 may also provide overcurrent protection and/or output current telemetry over an output pin (not shown), as either an analog voltage or current.

The controller 108 may also include a voltage position unit 114 which generates a target voltage regulation signal (Vreg_tgt) which indicates a target voltage regulation setpoint. The voltage position unit 114 may determine the target voltage regulation setpoint based on the phase current information 'iph_info' from the current sense and balance circuit 112 and voltage ID information (VID) provided, e.g., by the load 102.

The controller 108 may also include a voltage sense circuit 116 that provides voltage error information (Verr) to the modulator 110, for determining the duty cycle of the power stages 106 included in each phase. The voltage sense circuit 116 may determine the voltage error information 'Verr' based on the target voltage regulation signal 'Vreg_tgt' from the voltage position unit 114 and the measured/sensed regulated output voltage Vout.

The modulator 110 included in the controller 108 generates a separate switching control signal 'PWM_N' for each phase of the multiphase power converter based on the voltage error information 'Verr' from the voltage sense circuit 116 and the duty cycle adjustments 'Adj_duty' from the current sense and balance circuit 112, such that the output voltage Vout of the power converter 104 is regulated. Each power stage 106 included in each phase of the multiphase power converter 104 has a corresponding driver circuitry 118. The power stage 106 and corresponding driver circuitry 118 may be integrated on the same semiconductor die or in the same package which may include the driver circuitry 118, a high-side switch device (HS), a low-side switch device (LS), and internal and interface circuits (not shown) to provide a single trivalent PWM input 'PWM_N' that controls when the high-side switch device 'HS' is on, the low-side switch device 'LS' is on, or neither switch device is on.

More particularly, the high-side switch device 'HS' of each power stage 106 is configured to connect the output node 120 of the power stage 106 to a supply voltage (Vin) in a first switching state of the power stage 106. The low-side switch device 'LS' of the same power stage 106 is configured to connect the output node 120 to ground in a second switching state of the power stage 106. The high-side and low-side switch devices 'HS', 'LS' may be power MOSFETs (metal-oxide-semiconductor field effect transistors), IGBTs (insulated gate bipolar transistors), HEMTs (high-electron mobility transistors), etc. The driver circuitry 118 associated with the corresponding power stage 106 generates gate drive signals ('HG', 'LG' in FIG. 2) for gates of the high-side and low-side switch devices 'HS', 'LS', for setting the power stage 106 in the first switching state, the second switching state or a non-switching state in which both switch devices are off. The duration of each state and a timing transition between the states is indicated by the corresponding switching control signal 'PWM_N' provide by the modulator 110. Current sense circuitry 122 included in each power stage 106 measures current flowing through at least one of the switch devices of the power stage 106. Timing circuitry 124 included in each power stage 106 adjusts the timing transition between the switching states so as to change an effective duration (e.g. duty cycle) of the first switching state and/or the second switching state relative to a reference duration defined by the corresponding switching control signal 'PWM_N' received from the modulator 110. The adjustment to the timing transition made by the timing circuitry 124 is based on the magnitude of the current measured by the current sense circuitry 122 included in the power stage 106. This way, each individual power stage 106 can limit its current hogging based on its own internal current measurement information.

The anti-current hogging scheme described herein is different from current balancing. As explained previously herein in connection with the operation of current sense and balance circuit 112, current balancing is a scheme whereby the controller 108 attempts to balance the currents across the phases based on a difference between the phase currents so that each phase delivers approximately the same current to the load 102. The anti-current hogging scheme implemented by each power stage 106 instead adjusts the effective duration (e.g. duty cycle) of the first and/or second switching state based on its own absolute current measurement independent of any other power stage current.

Figure 2:
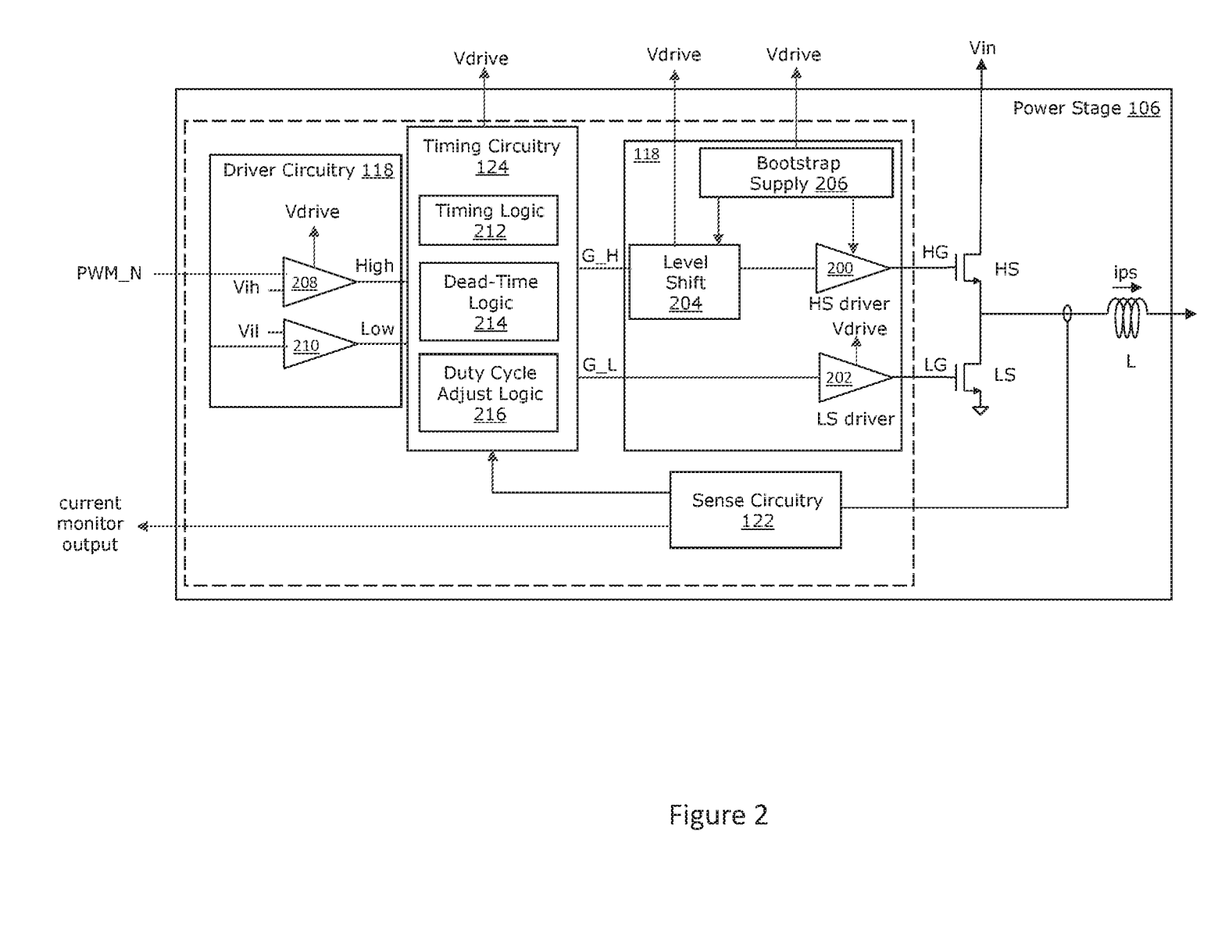
FIG. 2 illustrates an instance of a power stage included in the multiphase power converter, according to an embodiment.

FIG. 2 illustrates one instance of a power stage 106, according to an embodiment. The driver circuitry 118 of the power stage 106 includes a high-side driver 200 for driving the gate of the high-side switch device 'HS' with a high-side gate drive signal 'HG', and a low-side driver 202 for driving the gate of the low-side switch device 'LS' with a low-side gate drive signal 'LG'. The driver circuitry 118 also includes level shift circuitry 204 for level shifting the input signal to the high-side driver 200 based on a reference voltage 'Vdrive', since the high-side switch device 'HS' is referenced to the power stage input voltage Vin. A bootstrap supply 206 of the driver circuitry 118 powers the level shift circuitry 204 and the high-side driver 200.

Each power stage 106 of the same phase receives the switching control signal 'PWM_N' for that phase from the controller 108. A first comparator 208 referenced to Vdrive compares the incoming switching control signal 'PWM_N' to a first (high) threshold 'Vih' to indicate when the switching control signal 'PWM_N' is at a logic high level 'High'. A second comparator 210 also referenced to Vdrive compares the incoming switching control signal 'PWM_N' to a second (low) threshold 'Vil' to indicate when the switching control signal 'PWM_N' is at a logic low level 'Low'. The power stage current sense circuitry 122 is a current monitor, according to the embodiment illustrated in FIG. 2. The current monitor 122 measures the output current 'ips' of the power stage 106 before the current enters the corresponding output inductor L. The current monitor 122 provides the measured current information to the power stage timing circuitry 124, and also reports the measured current information to the controller 108. The current monitor 122 may measure the current flowing through just the high-side switch device 'HS', the current flowing through just the low-side switch device 'LS' or the current flowing through both the high-side switch device 'HS' and the low-side switch device 'LS'.

The timing circuitry 124 included in the power stage 106 includes timing logic 212 for determining a gate signal 'G_H' for the high-side switch device 'HS' and a gate signal 'G_L' for the low-side switch device 'LS'. The timing circuitry 124 also includes dead-time logic 214 which ensures that the high-side switch device 'HS' and the low-side switch device 'LS' are not on at the same time, by inserting dead-time between the gate signal 'G_H' for the high-side switch device 'HS' and the gate signal 'G_L' for the low-side switch device 'LS'.

The timing circuitry 124 adjusts the timing transition between the switching states (HS on and LS off, or HS off and LS on) so as to change the effective duration of the first switching state (HS on and LS off) and/or the second switching state (HS off and LS on) relative to a reference duration defined by the switching control signal 'PWM_N' received by the power stage 106, the adjustment to the timing transition being based on the magnitude of the current measured by the current sense circuitry 122. The timing circuitry 124 includes duty cycle adjust logic 216 for adjusting the timing transition, according the embodiment illustrated in FIG. 2.

The high-side driver 200 of the driver circuitry 118 sets the power stage 106 in the first switching state by activating the high-side gate drive signal 'HG' applied to the gate of the high-side switch device 'HS'. The low-side driver 202 of the driver circuitry 118 sets the power stage 106 in the second switching state by activating the low-side gate drive signal 'LG' applied to the gate of the low-side switch device 'LS'. The power stage 106 is set in a non-switching state by the high-side driver 200 deactivating the high-side gate drive signal 'HG' and the low-side driver 202 deactivating the low-side gate drive signal 'LG'. As previously explained herein, the duration of each state and the timing transition between the states is indicated by the switching control signal 'PWM_N' received by the power stage 106. The driver circuitry 118, sense circuitry 122 and timing circuitry 124 may be integrated as a single unit, as indicated by the dashed box in FIG. 2. The driver integration may include all components of the power stage 106 except for the high-side switch device 'HS', the low-side switch device 'LS' and the output inductor L.

Figure 3:
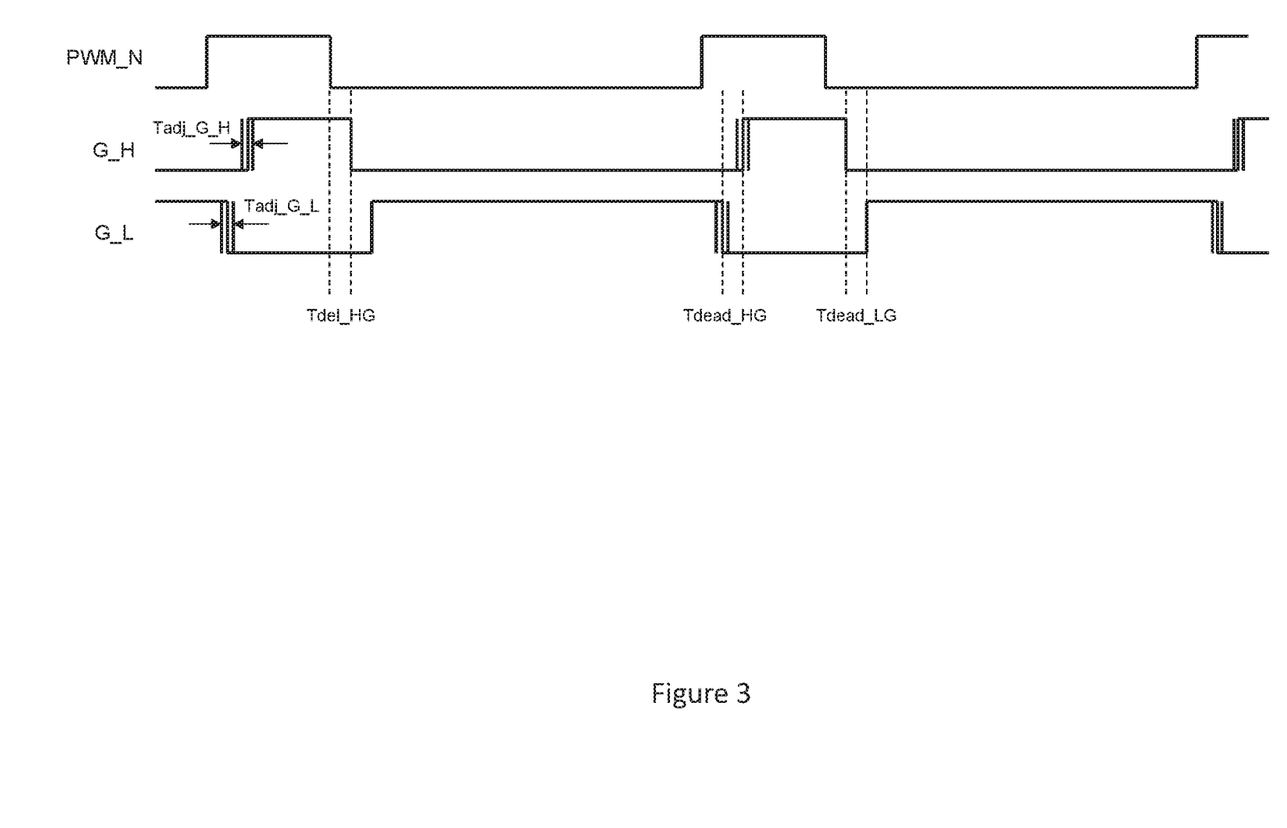
FIG. 3 illustrates a waveform diagram of an embodiment of adjusting the timing transition between switching states of a power stage of the multiphase power converter.

FIG. 3 illustrates an embodiment in which illustrates an embodiment according to which the switching control signal 'PWM_N' received by the power stage 106 is a PWM signal. In FIG. 3, the switching control signal 'PWM_N' input represents a target duty cycle for the power stage output. 'Tdel_HG' is a PWM low transition delay applied by the timing logic 212 to the high-side gate signal 'G_H', for delaying when the high-side gate signal 'G_H' transitions from high to low. 'Tdead_HG' is a dead-time delay added by the dead-time logic 214 to the high-side gate signal 'G_H' generated by the timing logic 212, for delaying when G_H transitions from low to high. 'Tdead_LG' is a dead-time delay added by the dead-time logic 214 to the low-side gate signal 'G_L' generated by the timing logic 212, for delaying when G_L transitions from low to high. 'Tdead_HG' and 'Tdead_LG' may be variable delays set by the dead-time logic 214 and may be digital or analog delay-based. 'Tdead_LG' may be different than 'Tdead_HG'.

Further in FIG. 3, 'Tadj_G_H' is a variable low-to-high transition delay generated by the duty cycle adjust logic 216 for the high-side gate signal 'G_H'. 'Tadj_G_L' is a variable high-to-low transition delay generated by the duty cycle adjust logic 216 for the low-side gate signal 'G_L'. 'Tadj_G_H' and 'Tadj_G_L' may be in a range similar to the dead time adjustments 'Tdead_HG' and 'Tdead_L_G', e.g., in a range of about 5 ns to 30 ns. In general, 'Tadj_G_H' and 'Tadj_G_L' are implemented with a variable delay (analog or digital) such that the delay increases as the power stage current increases, with the effect being to reduce the effective on time or duty cycle of the power stage 106 so that a wider PWM input is required to achieve the same effective duty cycle which in turn reduces current hogging.

The timing logic 212 and the dead-time logic 214 of the timing circuitry 124 maintain the PWM duty cycle in the G_H and G_L gate signals, while optimizing the delay and ensuring non-overlap in the G_H and G_L gate signals to avoid both switch devices 'HS', 'LS' from being on at the same time and to avoid shoot-through current.

As the current measured by the current sense circuitry 122 of the power stage 106 increases, the duty cycle adjust logic 216 of the timing circuitry 124 adjusts the high-side timing transition 'Tadj_G_H' and/or the low-side timing transition 'Tadj_G_L' such that the duty cycle of the first switching state is reduced and/or the duty cycle of the second switching state is increased relative to the switching control signal 'PWM_N'. For example, the duty cycle of the first switching state may be reduced relative to the switching control signal 'PWM_N' by increasing 'Tadj_G_H' so that the high-side gate signal 'G_H' experiences greater delay before transitioning from low to high. Accordingly, the high-side switch device 'HS' is on for less time than indicated by the duty cycle of the switching control signal 'PWM_N'. In another example, the duty cycle of the second switching state may be increased relative to the switching control signal 'PWM_N' by increasing 'Tadj_G_L' so that the low-side gate signal 'G_L' experiences more delay before transitioning from high to low. Accordingly, the low-side switch device 'LS' is on for more time than indicated by the duty cycle of the switching control signal 'PWM_N'.

As the current measured by the current sense circuitry 122 of the power stage 106 decreases, the duty cycle adjust logic 216 of the timing circuitry 124 adjusts the high-side timing transition 'Tadj_G_H' and/or the low-side timing transition 'Tadj_G_L' such that the duty cycle of the first switching state is increased and/or the duty cycle of the second switching state is decreased relative to the switching control signal 'PWM_N'. For example, the duty cycle of the first switching state may be increased relative to the switching control signal 'PWM_N' by decreasing 'Tadj_G_H' so that the high-side gate signal 'G_H' experiences less delay before transitioning from low to high. Accordingly, the high-side switch device 'HS' is on for more time than indicated by the duty cycle of the switching control signal 'PWM_N'. In another example, the duty cycle of the second switching state may be decreased relative to the switching control signal 'PWM_N' by decreasing 'Tadj_G_L' so that the low-side gate signal 'G_L' experiences less delay before transitioning from high to low. Accordingly, the low-side switch device 'LS' is on for less time than indicated by the duty cycle of the switching control signal 'PWM_N'.

The duty cycle adjust logic 216 of the timing circuitry 124 modifies the signal timing provided by the timing logic 212, so that current sense information for the power stage 106 is used to adjust the effective duty cycle of the power stage switching, such that as the power stage current increases, the effective duty cycle of the half bridge ('HS' and 'LS') switching relative to the PWM input duty cycle is reduced. That is, the duty cycle adjust logic 216 of the timing circuitry 124 narrows the effective duty cycle of the power stage 106 as the power stage current increases. This provides anti-current hogging protection when the power stage 106 is used in a parallel mode. There is no need to increase the controller pin count or make further modifications to the power stage 106, and the anti-current hogging scheme does not depend on the current of the other power stages 106 coupled in parallel.

In one embodiment, the duty cycle adjust logic 216 of the timing circuitry 124 adjusts the high-side timing transition 'Tadj_G_H' and/or the low-side timing transition 'Tadj_G_L' based on a ratio of the magnitude of the current measured by the current sense circuitry 122 and a reference current level. For example, the reference current level may be a maximum current threshold for the power stage 106.

Figure 4:
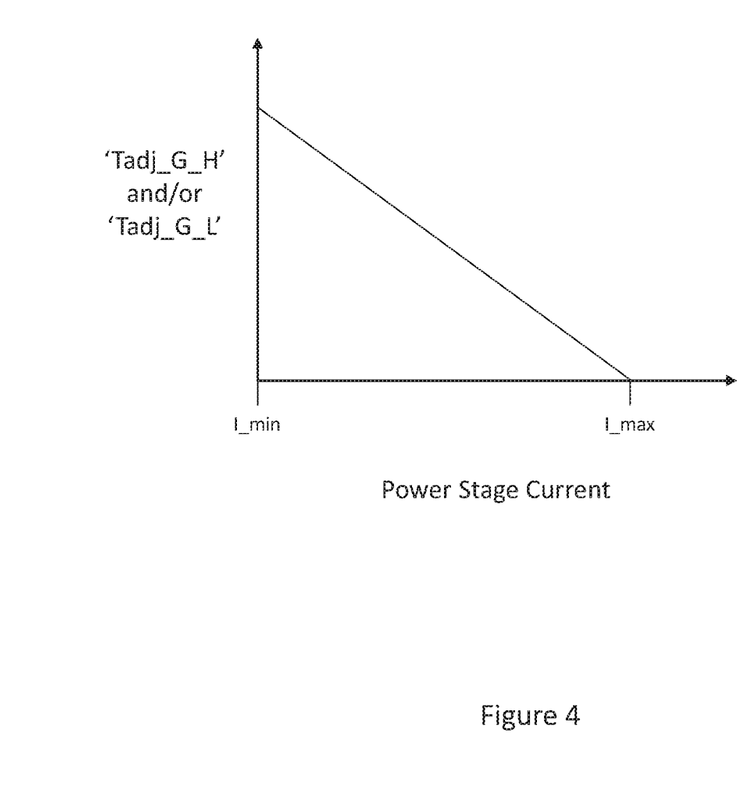
FIG. 4 illustrates a waveform diagram of another embodiment of adjusting the timing transition between switching states of a power stage of the multiphase power converter.

FIG. 4 illustrates an embodiment in which the duty cycle adjust logic 216 of the timing circuitry 124 adjusts the high-side timing transition 'Tadj_G_H' and/or the low-side timing transition 'Tadj_G_L' in a manner that is monotonic and linearly proportional to the magnitude of the current measured by the current sense circuitry 122. As the current ('Power Stage Current') measured by the current sense circuitry 122 of the power stage 106 increases, the duty cycle adjust logic 216 adjusts the high-side timing transition 'Tadj_G_H' and/or the low-side timing transition 'Tadj_G_L' such that the duty cycle of the first switching state is reduced and/or the duty cycle of the second switching state is increased relative to the switching control signal 'PWM_N'. Conversely, as the current measured by the current sense circuitry 122 of the power stage 106 decreases, the duty cycle adjust logic 216 adjusts the high-side timing transition 'Tadj_G_H' and/or the low-side timing transition 'Tadj_G_L' such that the duty cycle of the first switching state is increased and/or the duty cycle of the second switching state is decreased relative to the switching control signal 'PWM_N'.

Figure 5:
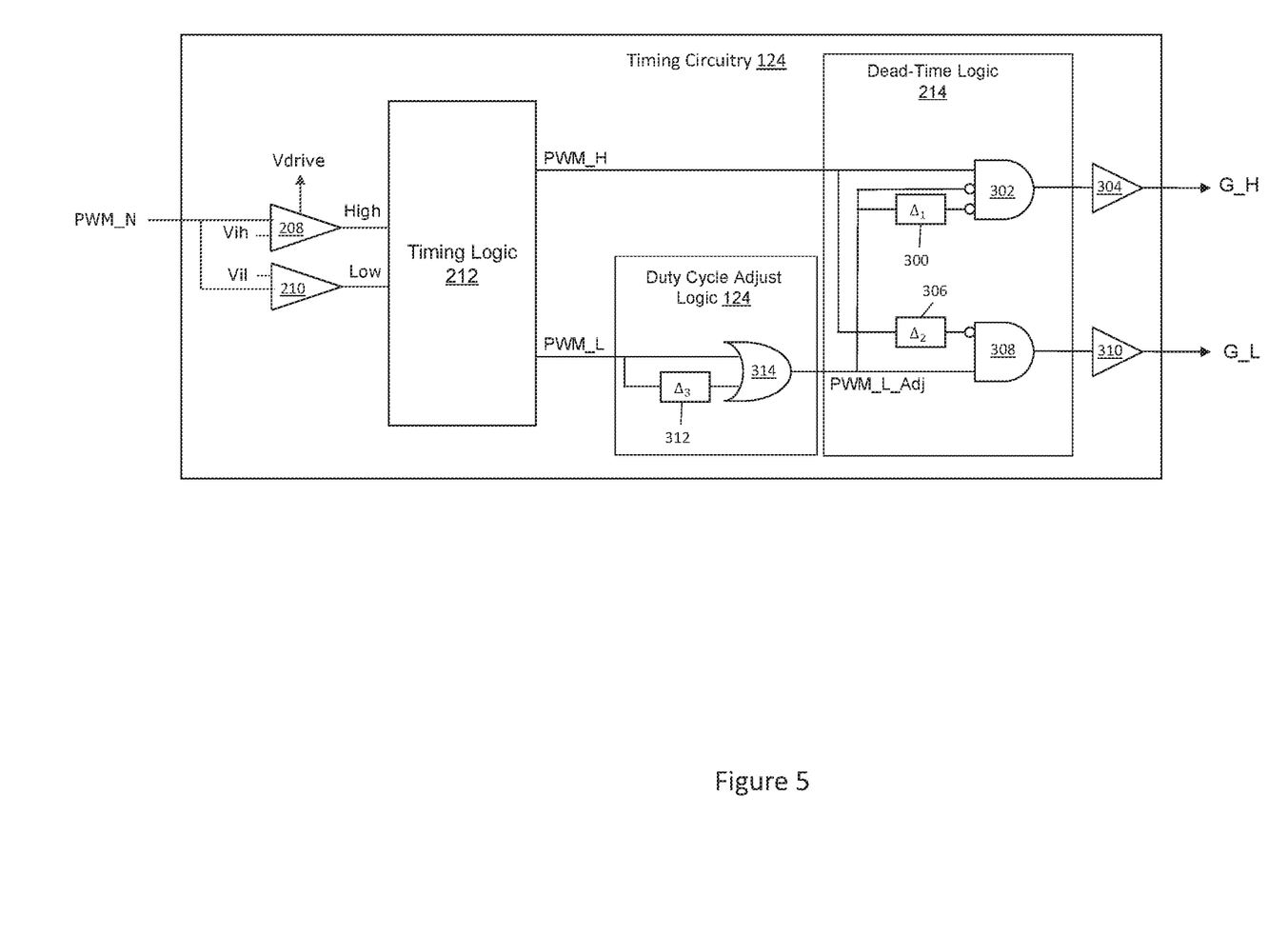
FIG. 5 illustrates a block diagram of an embodiment of timing circuitry included in each power stage of the multiphase power converter, for adjusting the timing transition between power stage switching states.

FIG. 5 illustrates another embodiment of the timing circuitry 124 included in each power stage 106. According to this embodiment, the timing logic 212 detects the incoming PWM signal 'PWM_N' based on the signal levels 'High', 'Low' detected by the comparators 208, 210 and outputs respective high-side and low-side PWM signals 'PWM_H', 'PWM_L'. The PWM input detection determines when the PWM should be effectively set to high ('PWM_H') or low ('PWM_L'). Both signals 'PWM_H', 'PWM_L' may be low at the same time, but are not high at the same time. In addition to threshold and hysteresis, the timing logic 212 may ensure a minimum pulse width for both signals 'PWM_H', 'PWM_L' to avoid very narrow pulses from changing the power switch states.

The dead-time logic 214 include a first duty cycle adjustment circuit that includes a first delay block 300 having a first delay $\Delta_1$ and a first logic gate 302 for extending the high-side dead time 'Tdead_HG' by blocking the high-side gate signal G_H which is provided to the power stage driver circuitry 118 by a first buffer 304. The dead-time logic 214 also includes a second duty cycle adjustment circuit that includes a second delay block 306 having a second delay $\Delta_2$ and a second logic gate 308 for extending the low-side dead time 'Tdead_LG' by blocking the low-side gate signal G_L which is provided to the power stage driver circuitry 118 by a second buffer 310. The high-side and low-side gate signals G_H, G_L are delayed versions of the respective PWM signals 'PWM_H', 'PWM_L' detected by the timing logic 212.

The duty cycle adjust logic 216 includes a third delay block 312 having a third delay $\Delta_3$ and a third logic gate 314, according to the embodiment illustrated in FIG. 5. The duty cycle adjust logic 216 derives a PWM pulse 'PWM_L_Adj' from the switching control signal 'PWM_L' for the low-side switch device 'LS' and adjusts the timing transition by extending the PWM pulse based on the variable delay $\Delta_3$ of the third delay block 312. The variable delay $\Delta_3$ of the third delay block 312 is based on the magnitude of the current measured by the current sense circuitry 122 for the power stage 106. The third logic gate 314 may be implemented as a logic OR gate so that the PWM pulse 'PWM_L_Adj' derived from the switching control signal 'PWM_L' for the low-side switch device 'LS' is active so long as either the switching control signal 'PWM_L' or the delayed version of the switching control signal 'PWM_L' is active. The duty cycle adjust logic 216 may instead derive a PWM pulse (not shown) from the switching control signal 'PWM_H' for the high-side switch device 'HS' and adjust the timing transition by increasing or decreasing the PWM pulse based on a variable delay that is based on the magnitude of the current measured by the current sense circuitry 122 for the power stage 106. The duty cycle adjust logic 216 may instead derive a PWM pulse for both switching control signals 'PWM_H', 'PWM_L' based on a variable delay that is based on the magnitude of the current measured by the current sense circuitry 122 for the power stage 106. In FIG. 5, the PWM_H block path is deleted or modified to allow the pulse width adjustment at the beginning of the PWM_H cycle.

Figure 6:
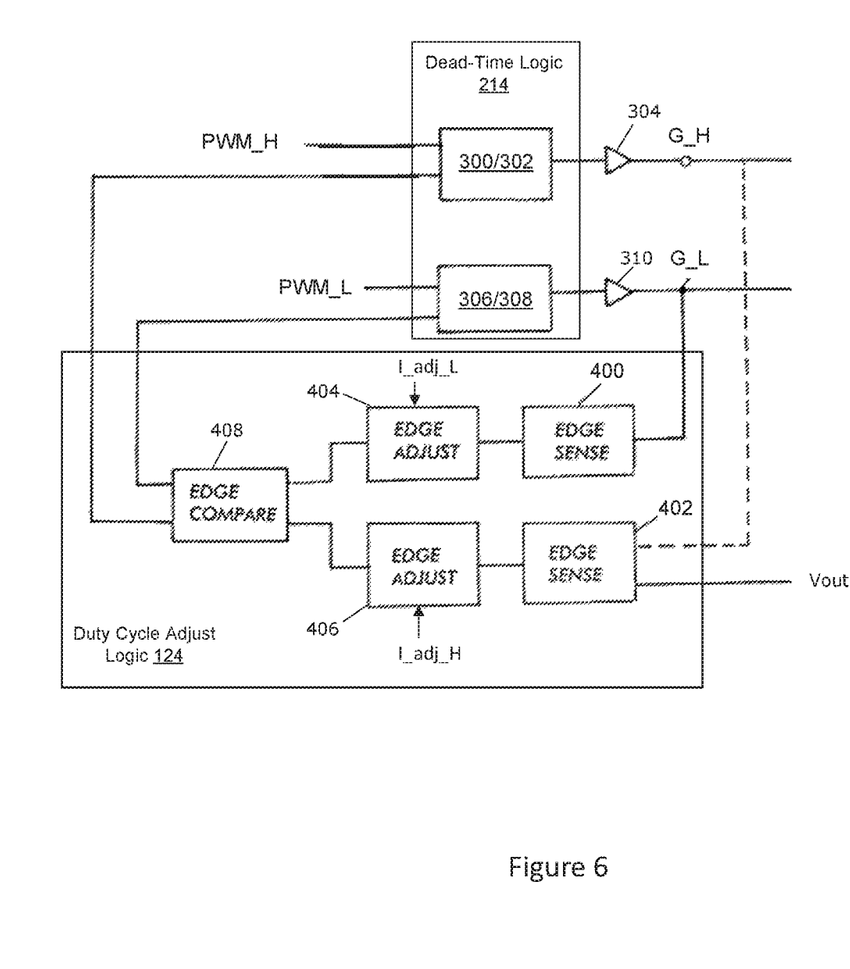
FIG. 6 illustrates a block diagram of another embodiment of timing circuitry included in each power stage of the multiphase power converter, for adjusting the timing transition between power stage switching states.

FIG. 6 illustrates another embodiment of the duty cycle adjust logic 216 included in the timing circuitry 124 of each power stage 106. According to this embodiment, the duty cycle adjust logic 216 includes a first edge sense circuit 400 for detecting the rising or falling edge of the low-side gate signal 'G_L'. The duty cycle adjust logic 216 also includes a second edge sense circuit 402 for detecting the rising or falling edge of the high-side gate signal 'G_H' or the output voltage Vout. Respective edge adjust circuits 404, 406 apply a corresponding variable adjustment 'I_adj_H'/'I_adj_L' which is based on the magnitude of the current measured by the current sense circuitry 122 for the power stage 106. Edge compare logic 408 compares the edge of the adjusted high-side PWM pulse to the edge of the adjusted low-side PWM pulse to determine a dead time adjustment between the first switching state and the second switching state. The dead-time logic 214 adjusts the timing transition between the switching states by modifying the dead time based on the output of the edge compare logic 408 which in turn is based on the magnitude of the current measured by the current sense circuitry 122 of the power stage 106.

Figure 7:
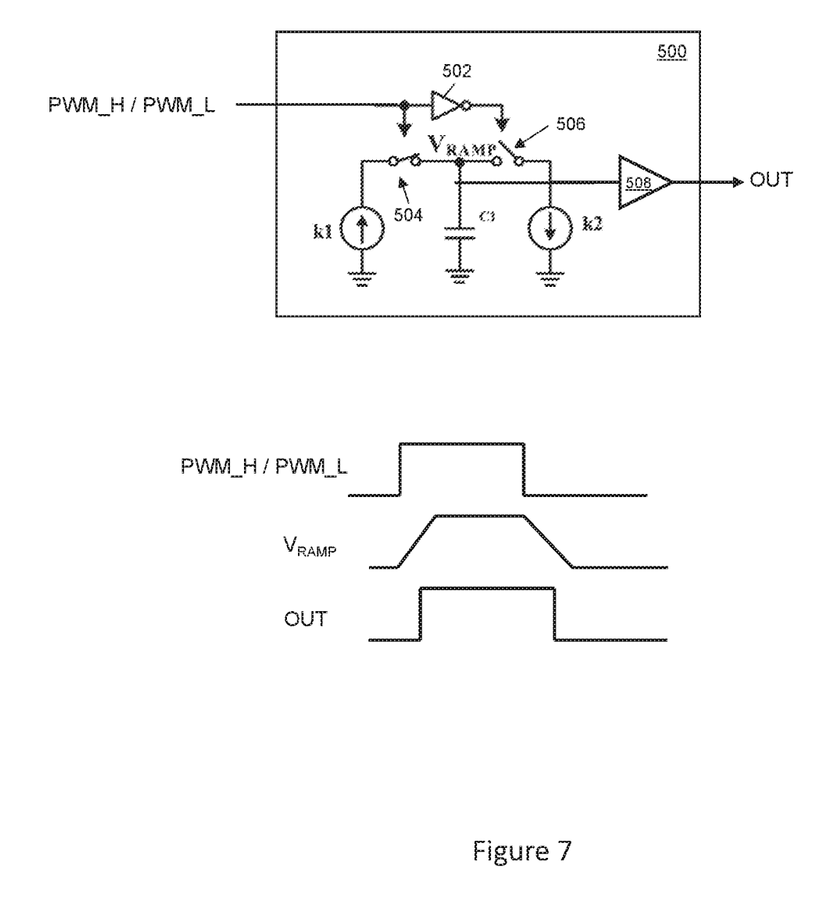
FIG. 7 illustrates a block diagram of an embodiment of timing circuitry included in each power stage of the multiphase power converter, for adjusting the timing transition between power stage switching states.

FIG. 7 illustrates another embodiment of the duty cycle adjust logic 216 included in the timing circuitry 124 of each power stage 106. According to this embodiment, the duty cycle adjust logic 216 includes a current limited buffer 500 for implementing the variable delay. The current limited buffer 500 has different adjustments for ON delay and OFF delay. The corresponding switching control signal 'PWM_H'/'PWM_L' generated by the timing logic 212 of the timing circuitry 124 is delayed by an inverter 502. The non-delayed version of the switching control signal 'PWM_H'/'PWM_L' actuates a first switch 504, and the delayed version of the switching control signal 'PWM_H'/'PWM_L' actuates a second switch 506. The first switch 504 connects a first current source k1 to a voltage ramp node '$V_{RAMP}$'. The second switch 506 connects the voltage ramp node '$V_{RAMP}$' to a second current source k2. The voltage ramp node '$V_{RAMP}$' is also connected to an output buffer 508 and to a capacitor C1.

The bottom half of FIG. 7 shows the profile of the voltage at the voltage ramp node '$V_{RAMP}$', as a function of the switching control signal 'PWM_H'/'PWM_L'. The bottom half of FIG. 7 also shows the output 'OUT' of the current limited buffer 500 and which corresponds to the adjusted PWM pulse 'PWM_L_Adj'/'PWM_H_Adj'. The ramp-up profile of the voltage at the voltage ramp node '$V_{RAMP}$' is determined by the first current source k1 and the ramp-down profile of the voltage is determined by the second current source k1. Accordingly, the values of the current sources k1, k2 determine the amount of timing transition adjustment implemented by the duty cycle adjust logic 216. The values of the current sources k1, k2 are based on the magnitude of the current measured by the current sense circuitry 122 of the power stage 106. Since two current sources k1, k2 are used, both ON delay and OFF delay adjustment may be made.

Figure 8:
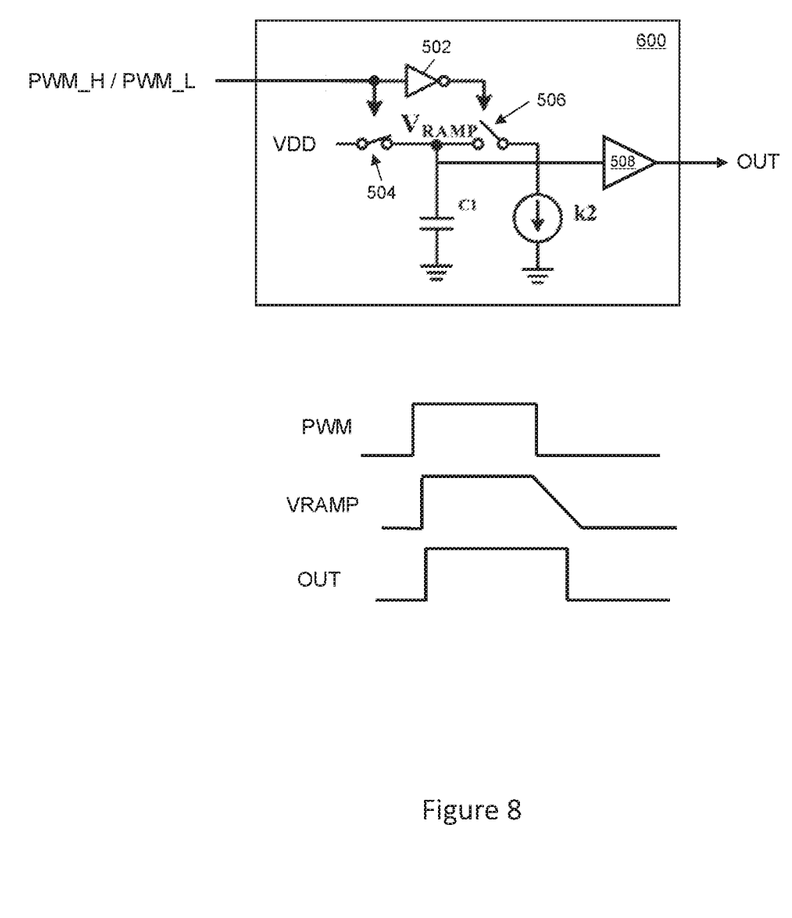
FIG. 8 illustrates a block diagram of an embodiment of timing circuitry included in each power stage of the multiphase power converter, for adjusting the timing transition between power stage switching states.

FIG. 8 illustrates another embodiment of the duty cycle adjust logic 216 included in the timing circuitry 124 of each power stage 106. According to this embodiment, the duty cycle adjust logic 216 includes a pulse widening circuit 600 for implementing the variable delay. The embodiment shown in FIG. 8 is similar to the embodiment shown in FIG. 7. Different, however, the first switch 504 connects the voltage ramp node '$V_{RAMP}$' to a voltage source VDD instead of a current source to form the pulse widening circuit 600.

The pulse widening circuit 600 adjusts the width of the corresponding switching control signal 'PWM_H'/'PWM_L' based on the variable delay implemented by current source k2, as shown in the bottom half of FIG. 8.

As previously explained herein, each power stage 106 of the multiphase power converter 104 uses the absolute current measurement for that power stage 106 in adjusting the timing transition between switching states independent of any other power stage current. The anti-current hogging scheme described herein does not perform current balancing, but instead ensures there is no runaway condition. The anti-current hogging scheme utilizes a relationship between the effective duty cycle and input duty cycle which has a characteristic that as the current increases, yielding less effective duty cycle which reduces the current delivered by the power stage 106. Nominal duty cycle may be in a range of 12-15% and the adjustment implemented by the anti-current hogging scheme may be in a range of 5-8% of the nominal duty cycle.

For example, power stage current range may be 60 A to 100 A maximum. In the case of four power stages 106 coupled in parallel to form a phase of the multiphase power converter 104, two power stages 106 may try to supply 50 A where the nominal duty cycle is 14% at 50 A. The controller 108 adjusts the duty cycle based on total output current and current balance among the phases. If the third power stage 106 in the phase outputs 60 A and the fourth power stage 106 in the same phase outputs 40 A, a difference of 0.3% duty cycle arises between the power stages 106. The 0.3% duty cycle difference builds up substantial current difference over time. The power stage 106 which is delivering 60 A instead of 50 A starts losing current because the anti-current hogging scheme described herein yields a narrower duty cycle for that power stage 106, whereas the power stage 106 outputting 40 A begins to gain current because the anti-current hogging scheme described herein yields a wider duty cycle for that power stage 106. While the controller 108 tries to balance all power stages 106 across all phases, each individual power stage 106 within the same phase implements the anti-current hogging scheme described.

The anti-current hogging scheme may be open loop where an internal signal is generated based on individual power stage current sense information. The internal signal may be used to vary internal power stage delay to achieve effective reduction in duty cycle. Returning to the 4 power stage example where one power stage 106 is at 60 A, two power stages 106 are at 50 A, and the fourth power stage 106 is at 40 A, variable delay may be implemented on the rising edge of the corresponding PWM signal. Delay for the power stage 106 is at 60 A may be implemented as function of absolute current for that power stage 106, which effectively narrows the PWM pulse width. Each power stage 106 of the same phase implements the anti-current hogging scheme the same way, but based on its own absolute current measurement.

While various embodiments of the timing circuitry 124 for implementing the anti-current hogging scheme have been described, additional implementations are considered. For example, the timing circuitry 124 typically has a mix of fast and slow buffers (delay circuits), timing logic and current sense circuit. If a particular power stage 106 is outputting more current than expected, the timing circuitry 124 may use more slow buffers to increase the internal power stage delay. If another power stage 106 is outputting less current than expected, the timing circuitry 124 may use more fast buffers to decrease the internal power stage delay. In either case, the delay is proportional to absolute current for that individual power stage 106. The anti-current hogging scheme may be implemented in the analog domain if implemented in the power stage driver circuitry 118, but instead may be implemented in the digital domain. Many different types of techniques may be used to implement the variable delay associated with the anti-current hogging scheme, including but not limited to voltage control, current control, varactors, etc.

Although the present disclosure is not so limited, the following numbered examples demonstrate one or more aspects of the disclosure.

Example 1: A power stage of a multi-phase power converter, the power stage comprising: a first switch device configured to connect an output node of the power stage to a supply voltage in a first switching state of the power stage; a second switch device configured to connect the output node to ground in a second switching state of the power stage; driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by a control signal received by the power stage; current sense circuitry configured to measure current flowing through at least one of the switch devices; and timing circuitry configured to adjust the timing transition between the switching states so as to change an effective duration of the first switching state and/or the second switching state relative to a reference duration defined by the control signal, wherein the adjustment to the timing transition is based on the magnitude of the current measured by the current sense circuitry.

Example 2. The power stage of example 1, wherein as the current measured by the current sense circuitry increases, the timing circuitry is configured to adjust the timing transition such that the effective duration of the first switching state is reduced and/or the effective duration of the second switching state is increased relative to the control signal.

Example 3. The power stage of example 1 or 2, wherein the timing circuitry is configured to adjust the timing transition based on a ratio of the magnitude of the current measured by the current sense circuitry and a reference current level.

Example 4. The power stage of example 3, wherein the reference current level is a maximum current threshold for the power stage.

Example 5. The power stage of any of examples 1 through 4, wherein the timing circuitry is configured to adjust the timing transition in a manner that is monotonic and linearly proportional to the magnitude of the current measured by the current sense circuitry.

Example 6. The power stage of any of examples 1 through 5, wherein the timing circuitry is configured to derive a PWM pulse from the control signal for the first switch device and/or the second switch device, and wherein the timing circuitry is configured to adjust the timing transition by extending the PWM pulse based on a variable delay that is based on the magnitude of the current measured by the current sense circuitry.

Example 7. The power stage of example 6, wherein the variable delay is implemented as a current limited buffer having different adjustments for ON delay and OFF delay.

Example 8. The power stage of example 6, wherein the variable delay is implemented as a pulse widening circuit.

Example 9. The power stage of any of examples 1 through 8, wherein the timing circuitry is configured to derive a first PWM pulse from the control signal for the first switch device and a second PWM pulse from the control signal for the second switch device, wherein the timing circuitry is configured to compare an edge of the first PWM pulse to an edge of the second PWM pulse to determine a dead time between the first switching state and the second switching state, and wherein the timing circuitry is configured to adjust the timing transition by modifying the dead time based on the magnitude of the current measured by the current sense circuitry.

Example 10. A multi-phase power converter, comprising: a plurality of phases, each phase configured to deliver a portion of a total current of the multi-phase power converter to a load connected to an output of the multi-phase power converter and comprising at least two power stages coupled in parallel; and a controller configured to generate a separate switching control signal for each phase, wherein the same switching control signal is provided to each parallel-coupled power stage of the same phase. Each power stage of each phase is coupled to the output of the multi-phase power converter and comprises: a first switch device configured to connect the load to a supply voltage in a first switching state of the power stage; a second switch device configured to connect the load to ground in a second switching state of the power stage; an inductor configured to couple an output of the power stage to the output of the multi-phase power converter; driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by the corresponding switching control signal generated by the controller; current sense circuitry configured to measure current flowing through at least one of the switch devices; and timing circuitry configured to adjust the timing transition between the switching states so as to change an effective duration of the first switching state and/or the second switching state relative to a reference duration defined by the switching control signal generated by the controller for the phase that includes the power stage, wherein the adjustment to the timing transition is based on the magnitude of the current measured by the current sense circuitry and independent of the current measured for the other power stages of the same phase.

Example 11. The multi-phase power converter of example 10, wherein the measured current for power stages of the same phase are coupled to a same current sense input terminal of the controller.

Example 12. The multi-phase power converter of example 11, wherein the measured currents for the power stages of the same phase are coupled via respective resistors to the same current sense input terminal of the controller.

Example 13. The multi-phase power converter of any of examples 10 through 12, wherein for each power stage of each phase, the timing circuitry is configured to adjust the timing transition as the current measured by the current sense circuitry of the power stage increases such that the effective duration of the first switching state is reduced and/or the effective duration of the second switching state is increased relative to the switching control signal generated by the controller for the phase that includes the power stage.

Example 14. The multi-phase power converter of any of examples 10 through 13, wherein for each power stage of each phase, the timing circuitry is configured to adjust the timing transition based on a ratio of the magnitude of the current measured by the current sense circuitry of the power stage and a reference current level.

Example 15. The multi-phase power converter of example 14, wherein for each power stage of each phase, the reference current level is a maximum current threshold for the power stage.

Example 16. The multi-phase power converter of any of examples 10 through 15, wherein for each power stage of each phase, the timing circuitry is configured to adjust the timing transition in a manner that is monotonic and linearly proportional to the magnitude of the current measured by the current sense circuitry of the power stage.

Example 17. An electronic system, comprising: a circuit board and one or more electronic circuits attached to the board and presenting a load to a multiphase power converter or power supply attached to the circuit board. The multi-phase power converter implements the power supply, is configured to provide power to the load, and comprises: a plurality of phases, each phase configured to deliver current to the load and comprising at least two power stages coupled in parallel; and a controller configured to provide a separate switching control signal to each phase, wherein each power stage of each phase comprises: a first switch device configured to connect the load to a supply voltage in a first switching state of the power stage; a second switch device configured to connect the load to ground in a second switching state of the power stage; driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by the corresponding switching control signal generated by the controller; current sense circuitry configured to measure current flowing through at least one of the switch devices; and timing circuitry configured to adjust the timing transition between the switching states so as to change an effective duration of the first switching state and/or the second switching state relative to a reference duration defined by the switching control signal generated by the controller for the phase that includes the power stage, wherein the adjustment to the timing transition is based on the magnitude of the current measured by the current sense circuitry and independent of the current measured for the other power stages of the same phase.

Example 18. The electronic system of example 17, wherein for each power stage of each phase of the multi-phase power converter, the timing circuitry is configured to adjust the timing transition as the current measured by the current sense circuitry of the power stage increases such that the effective duration of the first switching state is reduced and/or the effective duration of the second switching state is increased relative to the switching control signal generated by the controller for the phase that includes the power stage.

Example 19. The electronic system of example 17 or 18, wherein for each power stage of each phase of the multi-phase power converter, the timing circuitry is configured to adjust the timing transition based on a ratio of the magnitude of the current measured by the current sense circuitry of the power stage and a reference current level.

Example 20. The electronic system of any of examples 17 through 19, wherein for each power stage of each phase of the multiphase power converter, the timing circuitry is configured to adjust the timing transition in a manner that is monotonic and linearly proportional to the magnitude of the current measured by the current sense circuitry of the power stage.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power stage of a multi-phase power converter, the power stage comprising:
   a first switch device configured to connect an output node of the power stage to a supply voltage in a first switching state of the power stage;
   a second switch device configured to connect the output node to ground in a second switching state of the power stage;
   driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by a switching control signal received by the power stage;
   current sense circuitry configured to measure current flowing through at least one of the switch devices; and
   timing circuitry configured to adjust the timing transition between the switching states so as to change an effective duration of the first switching state and/or the second switching state relative to a reference duration defined by the switching control signal, wherein the adjustment to the timing transition is based on the magnitude of the current measured by the current sense circuitry.

2. The power stage of claim 1, wherein as the current measured by the current sense circuitry increases, the timing circuitry is configured to adjust the timing transition such that the effective duration of the first switching state is reduced and/or the effective duration of the second switching state is increased relative to the switching control signal.

3. The power stage of claim 1, wherein the timing circuitry is configured to adjust the timing transition based on a ratio of the magnitude of the current measured by the current sense circuitry and a reference current level.

4. The power stage of claim 3, wherein the reference current level is a maximum current threshold for the power stage.

5. The power stage of claim 1, wherein the timing circuitry is configured to adjust the timing transition in a manner that is monotonic and linearly proportional to the magnitude of the current measured by the current sense circuitry.

6. The power stage of claim 1, wherein the timing circuitry is configured to derive a PWM pulse from the switching control signal for the first switch device and/or the second switch device, and wherein the timing circuitry is configured to adjust the timing transition by extending the PWM pulse based on a variable delay that is based on the magnitude of the current measured by the current sense circuitry.

7. The power stage of claim 6, wherein the variable delay is implemented as a current limited buffer having different adjustments for ON delay and OFF delay.

8. The power stage of claim 6, wherein the variable delay is implemented as a pulse widening circuit.

9. The power stage of claim 1, wherein the timing circuitry is configured to derive a first PWM pulse from the switching control signal for the first switch device and a second PWM pulse from the switching control signal for the second switch device, wherein the timing circuitry is configured to compare an edge of the first PWM pulse to an edge of the second PWM pulse to determine a dead time between the first switching state and the second switching state, and wherein the timing circuitry is configured to adjust the timing transition by modifying the dead time based on the magnitude of the current measured by the current sense circuitry.

10. A multi-phase power converter, comprising:
a plurality of phases, each phase configured to deliver a portion of a total current of the multi-phase power converter to a load connected to an output of the multi-phase power converter and comprising at least two power stages coupled in parallel; and
a controller configured to generate a separate switching control signal for each phase,
wherein the same switching control signal is provided to each parallel-coupled power stage of the same phase,
wherein each power stage of each phase is coupled to the output of the multi-phase power converter and comprises:
a first switch device configured to connect the load to a supply voltage in a first switching state of the power stage;
a second switch device configured to connect the load to ground in a second switching state of the power stage;
an inductor configured to couple an output of the power stage to the output of the multi-phase power converter;
driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by the corresponding switching control signal generated by the controller;
current sense circuitry configured to measure current flowing through at least one of the switch devices; and
timing circuitry configured to adjust the timing transition between the switching states so as to change an effective duration of the first switching state and/or the second switching state relative to a reference duration defined by the switching control signal generated by the controller for the phase that includes the power stage, wherein the adjustment to the timing transition is based on the magnitude of the current measured by the current sense circuitry and independent of the current measured for the other power stages of the same phase.

11. The multi-phase power converter of claim 10, wherein the measured current for power stages of the same phase are coupled to a same current sense input terminal of the controller.

12. The multi-phase power converter of claim 11, wherein the measured currents for the power stages of the same phase are coupled via respective resistors to the same current sense input terminal of the controller.

13. The multi-phase power converter of claim 10, wherein for each power stage of each phase, the timing circuitry is configured to adjust the timing transition as the current measured by the current sense circuitry of the power stage increases such that the effective duration of the first switching state is reduced and/or the effective duration of the second switching state is increased relative to the switching control signal generated by the controller for the phase that includes the power stage.

14. The multi-phase power converter of claim 10, wherein for each power stage of each phase, the timing circuitry is configured to adjust the timing transition based on a ratio of the magnitude of the current measured by the current sense circuitry of the power stage and a reference current level.

15. The multi-phase power converter of claim 14, wherein for each power stage of each phase, the reference current level is a maximum current threshold for the power stage.

16. The multi-phase power converter of claim 10, wherein for each power stage of each phase, the timing circuitry is configured to adjust the timing transition in a manner that is monotonic and linearly proportional to the magnitude of the current measured by the current sense circuitry of the power stage.

17. An electronic system, comprising:
a circuit board; and
one or more electronic circuits attached to the board and presenting a load to a multiphase power converter or power supply attached to the circuit board,
wherein the multiphase power converter implements the power supply, is configured to provide power to the load, and comprises:
a plurality of phases, each phase configured to deliver current to the load and comprising at least two power stages coupled in parallel; and
a controller configured to provide a separate switching control signal to each phase,
wherein each power stage of each phase comprises:
a first switch device configured to connect the load to a supply voltage in a first switching state of the power stage;
a second switch device configured to connect the load to ground in a second switching state of the power stage;
driver circuitry configured to generate gate drive signals for gates of the first and the second switch devices, for setting the power stage in the first switching state, the second switching state or a non-switching state in which both switch devices are off, wherein a duration of each state and a timing transition between the states is indicated by the corresponding switching control signal generated by the controller;

current sense circuitry configured to measure current flowing through at least one of the switch devices; and timing circuitry configured to adjust the timing transition between the switching states so as to change an effective duration of the first switching state and/or the second switching state relative to a reference duration defined by the switching control signal generated by the controller for the phase that includes the power stage, wherein the adjustment to the timing transition is based on the magnitude of the current measured by the current sense circuitry and independent of the current measured for the other power stages of the same phase.

18. The electronic system of claim 17, wherein for each power stage of each phase of the multiphase power converter, the timing circuitry is configured to adjust the timing transition as the current measured by the current sense circuitry of the power stage increases such that the effective duration of the first switching state is reduced and/or the effective duration of the second switching state is increased relative to the switching control signal generated by the controller for the phase that includes the power stage.

19. The electronic system of claim 17, wherein for each power stage of each phase of the multiphase power converter, the timing circuitry is configured to adjust the timing transition based on a ratio of the magnitude of the current measured by the current sense circuitry of the power stage and a reference current level.

20. The electronic system of claim 17, wherein for each power stage of each phase of the multiphase power converter, the timing circuitry is configured to adjust the timing transition in a manner that is monotonic and linearly proportional to the magnitude of the current measured by the current sense circuitry of the power stage.

* * * * *